US011344953B2

(12) United States Patent
Hirano et al.

(10) Patent No.: US 11,344,953 B2
(45) Date of Patent: May 31, 2022

(54) CUTTING TOOL HOLDER

(71) Applicant: SUMITOMO ELECTRIC HARDMETAL CORP., Itami (JP)

(72) Inventors: Tsutomu Hirano, Itami (JP); Satoru Kukino, Itami (JP); Yosuke Shimamoto, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 16/631,992

(22) PCT Filed: May 23, 2018

(86) PCT No.: PCT/JP2018/019753
§ 371 (c)(1),
(2) Date: Jan. 17, 2020

(87) PCT Pub. No.: WO2019/021605
PCT Pub. Date: Jan. 31, 2019

(65) Prior Publication Data
US 2020/0230710 A1 Jul. 23, 2020

(30) Foreign Application Priority Data
Jul. 27, 2017 (JP) .............................. JP2017-145605

(51) Int. Cl.
B23B 27/10 (2006.01)
B23B 27/16 (2006.01)
(52) U.S. Cl.
CPC .......... B23B 27/1659 (2013.01); B23B 27/10 (2013.01)

(58) Field of Classification Search
CPC ...... B23B 27/10; B23B 2250/12; B23Q 11/10
See application file for complete search history.

(56) References Cited

U.S. PATENT DOCUMENTS 4,621,547 A 11/1986 Yankoff
4,682,916 A 7/1987 Briese
(Continued)

FOREIGN PATENT DOCUMENTS

DE 3429842 A1 * 2/1986 ........... B23Q 1/0036
EP 3112063 A1 * 1/2017 ......... B23B 27/1677
(Continued)

OTHER PUBLICATIONS

Description WO2018143089A1 (translation) obtained at https://worldwide.espacenet.com/ (last visited Sep. 16, 2021).*

Primary Examiner — Ryan Rufo
(74) Attorney, Agent, or Firm — Faegre Drinker Biddle & Reath LLP

(57) ABSTRACT

A cutting tool holder according to one embodiment supports a cutting insert including a rake face, a flank face, and a cutting edge. The cutting tool holder according to one embodiment includes: a holder body having a seat face on which the cutting insert is placed; a pressing member that positions and fixes the cutting insert to the holder body; and a fixing member that fixes the pressing member to the holder body. The pressing member has: a front end portion close to the cutting edge; and a base end portion distant away from the cutting edge. The front end portion is provided with a first coolant ejection hole. A first flow path is provided inside the holder body. A coolant reservoir and a second flow path are provided inside the pressing member.

7 Claims, 6 Drawing Sheets

(56) References Cited

U.S. PATENT DOCUMENTS

| | | | | |
|---|---|---|---|---|
| 4,848,198 | A * | 7/1989 | Royal | B23B 25/02 82/1.11 |
| 4,955,264 | A * | 9/1990 | Armbrust | B23B 25/02 407/11 |
| 5,718,156 | A * | 2/1998 | Lagrolet | B23B 27/10 407/11 |
| 2002/0122698 | A1 * | 9/2002 | Lagerberg | B23B 27/10 407/11 |
| 2007/0283794 | A1 * | 12/2007 | Giannetti | B23B 27/10 82/158 |
| 2007/0286689 | A1 * | 12/2007 | Giannetti | B23B 27/10 407/11 |
| 2008/0124180 | A1 * | 5/2008 | Breisch | B23B 29/043 407/110 |
| 2011/0305531 | A1 * | 12/2011 | Amstibovitsky | B23B 27/10 407/11 |
| 2011/0311323 | A1 * | 12/2011 | Hecht | B23B 27/10 407/11 |
| 2012/0230780 | A1 | 9/2012 | Henry et al. | |
| 2013/0078043 | A1 * | 3/2013 | Henry | B23B 27/10 407/11 |
| 2014/0334887 | A1 * | 11/2014 | Flolo | B23B 27/1666 407/11 |
| 2015/0273589 | A1 * | 10/2015 | Hoffer | B23Q 11/10 407/11 |
| 2015/0352640 | A1 * | 12/2015 | Frota de Souza Filho | B23B 27/10 407/11 |
| 2016/0067786 | A1 * | 3/2016 | Thelin | B23B 27/007 407/11 |
| 2017/0320141 | A1 * | 11/2017 | Musil | B23B 27/1666 |
| 2018/0369923 | A1 * | 12/2018 | Chen | B23B 27/16 |
| 2019/0001454 | A1 * | 1/2019 | Huang | B23Q 11/1023 |
| 2019/0184467 | A1 * | 6/2019 | Nagae | B23B 29/12 |
| 2020/0030885 | A1 * | 1/2020 | Mun | B23B 27/1611 |
| 2020/0180040 | A1 * | 6/2020 | Andoh | B23B 27/10 |

FOREIGN PATENT DOCUMENTS

| | | | |
|---|---|---|---|
| JP | S62-34703 A | | 2/1987 |
| JP | 05096444 A * | | 4/1993 |
| JP | 07227702 A * | | 8/1995 |
| JP | 08071813 A * | | 3/1996 |
| JP | 10094904 A * | | 4/1998 |
| JP | 2002-346810 A | | 12/2002 |
| JP | 2004-122262 A | | 4/2004 |
| JP | 2012-183634 A | | 9/2012 |
| JP | 2015-160266 A | | 9/2015 |
| WO | WO-2016/121663 A1 | | 8/2016 |
| WO | WO-2018/034339 A1 | | 2/2018 |
| WO | WO-2018/143089 A1 | | 8/2018 |
| WO | WO-2018143089 A1 * | 8/2018 | B23B 27/1677 |

\* cited by examiner

CUTTING TOOL HOLDER

TECHNICAL FIELD

The present disclosure relates to a cutting tool holder. The present application claims a priority based on Japanese Patent Application No. 2017-145605 filed on Jul. 27, 2017, the entire content of which is incorporated herein by reference.

BACKGROUND ART

Conventionally, an indexable bite described in Japanese Patent Laying-Open No. 2015-160266 (Patent Literature 1) has been known. The indexable bite described in Patent Literature 1 has a holder body, a cutting insert, a clamp piece, and a clamp screw. The holder body has a mounting seat. The cutting insert is placed on the mounting seat of the holder body. The clamp piece is attached to the holder body by the clamp screw. The clamp piece fixes the cutting insert to the holder body by pressing the cutting insert against the holder body. The holder body is provided with a coolant supply hole. The coolant supply hole supplies coolant from the flank face side of the cutting insert toward a cutting edge of the cutting tool.

CITATION LIST

Patent Literature

PTL 1: Japanese Patent Laying-Open No. 2015-160266

SUMMARY OF INVENTION

A cutting tool holder according to one embodiment of the present disclosure is a cutting tool holder that supports a cutting insert including a rake face, a flank face continuous to the rake face, and a cutting edge constituted of a ridgeline that defines a boundary between the rake face and the flank face. The cutting tool holder according to one embodiment of the present disclosure includes: a holder body having a seat face on which the cutting insert is placed; a pressing member that positions and fixes, to the holder body, the cutting insert placed on the seat face; and a fixing member that fixes the pressing member to the holder body. The pressing member has a front end portion and a base end portion, the front end portion being an end portion close to the cutting edge of the cutting insert placed on the seat face, the base end portion being an end portion distant away from the cutting edge of the cutting insert placed on the seat face. The front end portion is provided with a first coolant ejection hole via which coolant is ejected.

A first flow path through which the coolant flows is provided inside the holder body. A coolant reservoir and a second flow path are provided inside the pressing member, the coolant reservoir is connected to the first flow path when the pressing member is fixed to the holder body, the coolant reservoir stores the coolant supplied from the first flow path, and the second flow path supplies, to the first coolant ejection hole, the coolant stored in the coolant reservoir. In a cross section orthogonal to a flow direction of the coolant, the coolant reservoir has a cross sectional area larger than a cross sectional area of each of the first flow path and the second flow path. The coolant reservoir is disposed at the base end portion side relative to a position at which the pressing member is fixed to the holder body, in a direction from the front end portion toward the base end portion.

DETAILED DESCRIPTION

Figure 1:
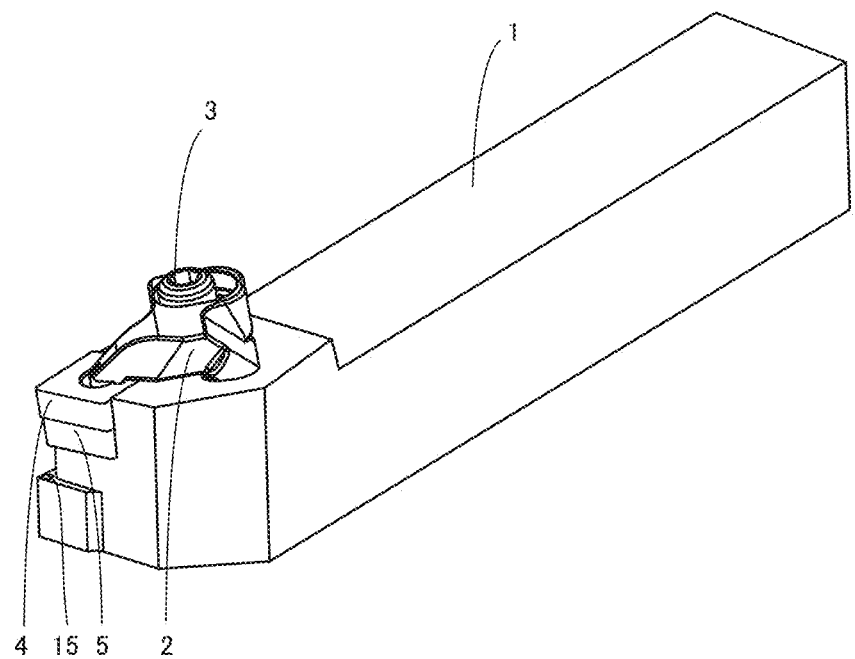
FIG. 1 is a perspective view of a cutting tool holder according to a first embodiment.

Problem to be Solved by the Present Disclosure

During cutting, swarf cut out from a workpiece moves from the cutting edge toward the rake face side. Therefore, in order to obtain a swarf crushing effect by coolant, the coolant is preferably supplied from the rake face side to the cutting edge. However, in the indexable bite described in Patent Literature 1, the coolant is supplied from the flank face side to the cutting edge.

Moreover, for improvement in processing precision of the cutting tool, it is necessary to suppress deformation of the holder during cutting by securing rigidity of the holder.

The present disclosure has been made in view of the above-described problem of the conventional art. More specifically, the present disclosure provides a cutting tool holder that can supply coolant from the rake face side of a cutting insert while securing rigidity thereof.

Advantageous Effect of the Present Disclosure

According to a cutting tool holder according to one embodiment of the present disclosure, coolant can be supplied from the rake face side of a cutting insert while securing rigidity thereof.

DESCRIPTION OF EMBODIMENTS

First, embodiments of the present disclosure are listed and described.

(1) A cutting tool holder according to one embodiment of the present disclosure is a cutting tool holder that supports a cutting insert including a rake face, a flank face continuous to the rake face, and a cutting edge constituted of a ridgeline that defines a boundary between the rake face and the flank face. The cutting tool holder according to one embodiment of the present disclosure includes: a holder body having a seat face on which the cutting insert is placed; a pressing member that positions and fixes, to the holder body, the cutting insert placed on the seat face; and a fixing member that fixes the pressing member to the holder body. The pressing member has a front end portion and a base end portion, the front end portion being an end portion close to the cutting edge of the cutting insert placed on the seat face, the base end portion being an end portion distant away from the cutting edge of the cutting insert placed on the seat face. The front end portion is provided with a first coolant ejection hole via which coolant is ejected.

A first flow path through which the coolant flows is provided inside the holder body. A coolant reservoir and a second flow path are provided inside the pressing member, the coolant reservoir is connected to the first flow path when the pressing member is fixed to the holder body, the coolant reservoir stores the coolant supplied from the first flow path, and the second flow path supplies, to the first coolant ejection hole, the coolant stored in the coolant reservoir. In a cross section orthogonal to a flow direction of the coolant, the coolant reservoir has a cross sectional area larger than a cross sectional area of each of the first flow path and the second flow path. The coolant reservoir is disposed at the base end portion side relative to a position at which the pressing member is fixed to the holder body, in a direction from the front end portion toward the base end portion.

According to the cutting tool holder according to (1), the coolant can be supplied to the cutting edge from the rake face side of the cutting insert while securing rigidity thereof.

(2) In the cutting tool holder according to (1), the pressing member may be in contact with the holder body only at a portion located opposite to the fixing member with respect to a straight line that is parallel to the direction from the base end portion toward the front end portion and that is tangential to the fixing member, when seen in a direction perpendicular to the rake face of the cutting insert placed on the seat face.

According to the cutting tool holder according to (2), the cutting insert can be fixed more uniformly by the pressing member.

(3) In the cutting tool holder according to (1) or (2), the cross sectional area of the second flow path in the cross section orthogonal to the flow direction of the coolant may become smaller from the coolant reservoir toward the first coolant ejection hole.

According to the cutting tool holder according to (3), the pressure of the coolant ejected from the first coolant ejection hole becomes higher. Therefore, according to the cutting tool holder according to (3), the cutting edge cooling effect and swarf crushing effect by the coolant can be improved.

(4) In the cutting tool holder according to any one of (1) to (3), a width of the first coolant ejection hole in a direction that is perpendicular to an ejection direction of the coolant and that is parallel to the rake face of the cutting insert placed on the seat face may be larger than a width of the first coolant ejection hole in a direction perpendicular to the rake face of the cutting insert placed on the seat face.

According to the cutting tool holder according to (4), the coolant ejected from the first coolant ejection hole is supplied to a vicinity of the cutting edge with the coolant being in a flat shape along the extending direction of the cutting edge. Therefore, in the cutting tool holder according to (4), the coolant is facilitated to enter between the cutting edge and the swarf. As a result, according to the cutting tool holder according to (4), the swarf crushing effect can be further improved.

(5) In the cutting tool holder according to any one of (1) to (4), the second flow path may have a first end and a second end opposite to the first end, the first end being an end of the second flow path in a direction that is perpendicular to an ejection direction of the coolant and that is parallel to the rake face of the cutting insert placed on the seat face. A first extension line and a second extension line may cross each other at a position overlapping with the cutting edge of the cutting insert placed on the seat face when seen in a direction perpendicular to the rake face of the cutting insert placed on the seat face, the first extension line being an extension line obtained by extending a straight line representing the first end from the first coolant ejection hole when seen in the direction perpendicular to the rake face of the cutting insert placed on the seat face, the second extension line being an extension line obtained by extending a straight line representing the second end from the first coolant ejection hole when seen in the direction perpendicular to the rake face of the cutting insert placed on the seat face.

In the cutting tool holder according to (5), the coolant ejected from the first coolant ejection hole is supplied to a cutting edge with the coolant being in the most converged state. Therefore, according to the cutting tool according to (5), the cutting edge cooling effect and swarf crushing effect by the coolant can be maximized partially.

(6) In the cutting tool holder according to any one of (1) to (4), the second flow path may have a first end and a second end opposite to the first end, the first end being an end of the second flow path in a direction that is perpendicular to an ejection direction of the coolant and that is parallel to the rake face of the cutting insert placed on the seat face. A first extension line and a second extension line may cross each other at a position displaced from the cutting edge when seen in a direction perpendicular to the rake face of the cutting insert placed on the seat face, the first extension line being an extension line obtained by extending a straight line representing the first end from the first coolant ejection hole when seen in the direction perpendicular to the rake face of the cutting insert placed on the seat face, the second extension line being an extension line obtained by extending a straight line representing the second end from the first coolant ejection hole when seen in the direction perpendicular to the rake face of the cutting insert placed on the seat face.

In the cutting tool holder according to (6), the coolant ejected from the first coolant ejection hole is supplied to the cutting edge with the coolant being spread along the extending direction of the cutting edge. Therefore, according to the cutting tool holder according to (6), a wider region of the cutting edge can be cooled by the coolant.

(7) In the cutting tool holder according to any one of (1) to (6), the holder body may be provided with a second coolant ejection hole via which the coolant is ejected to the cutting edge of the cutting insert from the flank face side of the cutting insert placed on the seat face. A third flow path that supplies, to the second coolant ejection hole, the coolant flowing through the first flow path may be provided inside the holder body.

In the cutting tool holder according to (7), the coolant can be supplied to the cutting edge of the cutting insert from both the rake face side of the cutting insert and the flank face side of the cutting insert. Therefore, according to the cutting tool holder according to (7), the cooling effect by the coolant and the lubrication effect by the coolant can be improved more.

Details of Embodiments of the Present Disclosure

Next, the following describes details of embodiments of the present disclosure with reference to figures. It should be noted that the same or corresponding portions in the figures are given the same reference characters. Moreover, at least a part of the embodiments described below may be appropriately combined.

First Embodiment

The following describes a configuration of a cutting tool holder according to a first embodiment.

FIG. 1 is a perspective view of the cutting tool holder according to the first embodiment. As shown in FIG. 1, the cutting tool holder according to the first embodiment supports a cutting insert 4. The cutting tool holder according to the first embodiment has a holder body 1, a pressing member 2, and a fixing member 3. The cutting tool holder according to the first embodiment may further have a washer 5. It should be noted that the cutting tool holder according to the first embodiment supports cutting insert 4; however, the cutting tool holder according to the present disclosure is not limited to this and is applicable to usage for supporting various cutting tools.

Figure 2:
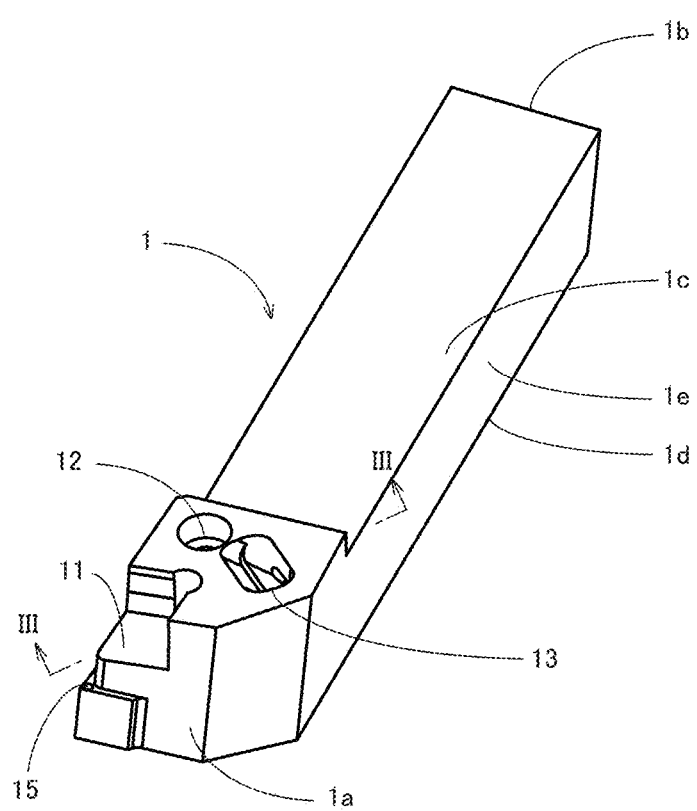
FIG. 2 is a perspective view of a holder body 1 in the cutting tool holder according to the first embodiment.

FIG. 2 is a perspective view of holder body 1 in the cutting tool holder according to the first embodiment. As shown in FIG. 2, holder body 1 has a first end 1a and a second end 1b. Second end 1b is an end opposite to first end 1a. First end 1a is an end at a side at which a below-described seat face 11 is provided. Second end 1b is an end at the shank side. For example, holder body 1 has a shape extending from second end 1b toward first end 1a. Holder body 1 has a first surface 1c, a second surface 1d, and a third surface 1e. Second surface 1d is a surface opposite to first surface 1c. Third surface 1e is continuous to first surface 1c and second surface 1d.

Holder body 1 has seat face 11. Seat face 11 is provided at first surface 1c of holder body 1 and is a surface lowered from first surface 1c by one step. Cutting insert 4 is placed on seat face 11. It should be noted that in the present embodiment, washer 5 is disposed between cutting insert 4 and seat face 11; however, washer 5 can be omitted.

A screw hole 12 is provided in holder body 1. Screw hole 12 extends in a direction from first surface 1c of holder body 1 toward the inside of holder body 1. An insertion portion 13 is provided in holder body 1. First surface 1c of holder body 1 is recessed at insertion portion 13 in the direction toward the inside of holder body 1.

Figure 3:
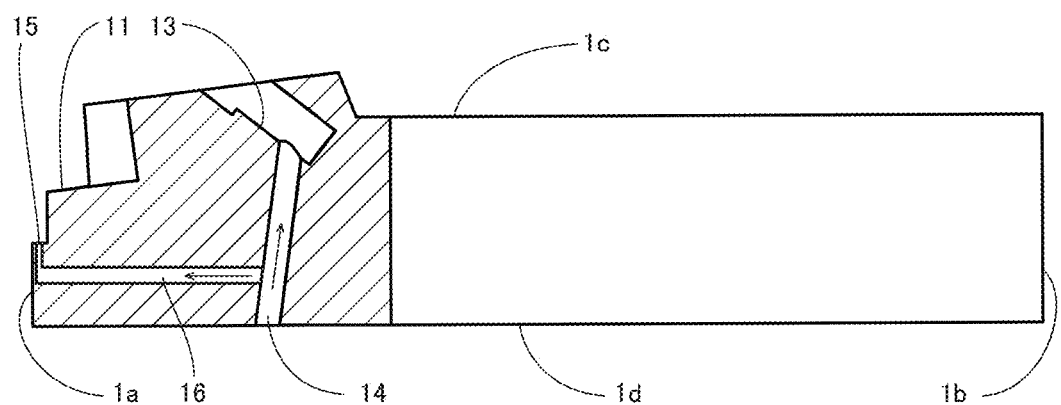
FIG. 3 is a cross sectional view along III-III of FIG. 2.

FIG. 3 is a cross sectional view along in FIG. 2. It should be noted that flows of the coolant are represented by arrows in FIG. 3. As shown in FIG. 3, a first flow path 14 is provided in holder body 1. At insertion portion 13, one end of first flow path 14 is connected to outside of holder body 1. At second surface 1d of holder body 1, the other end of first flow path 14 is connected to the outside of holder body 1, for example. The coolant flows in first flow path 14. The coolant is cutting oil, for example. First flow path 14 has a cross section A1. Cross section A1 is a cross section of first flow path 14 in a cross section orthogonal to the flow direction of the coolant. Between the one end and the other end of first flow path 14, first flow path 14 does not have a portion at which cross section A1 is partially larger than those of adjacent portions. That is, cross section A1 is monotonously decreased, monotonously increased, or constant from the one end side toward the other end side. From another viewpoint, it is said that no coolant reservoir is provided inside holder body 1. A coolant ejection hole 15 may be further provided in holder body 1. A third flow path 16 may be further provided inside holder body 1. Coolant ejection hole 15 is provided at the first end 1a side of holder body 1. Holder body 1 opens at coolant ejection hole 15. Third flow path 16 has one end connected to first flow path 14, and has the other end connected to coolant ejection hole 15. Therefore, part of the coolant flowing in first flow path 14 is ejected from coolant ejection hole 15 via third flow path 16. As shown in FIG. 1, coolant ejection hole 15 is preferably disposed to face cutting edge 43 provided in cutting insert 4. That is, the coolant ejected from coolant ejection hole 15 is supplied from the flank face 42 side to the vicinity of cutting edge 43.

Figure 4:
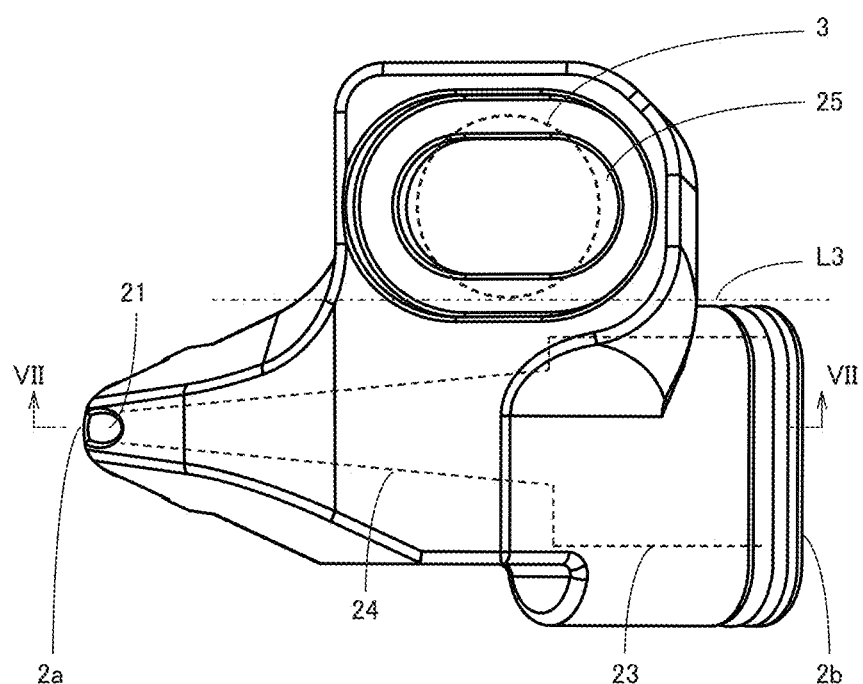
FIG. 4 is an upper view of a pressing member 2 in the cutting tool holder according to the first embodiment.
Figure 5:
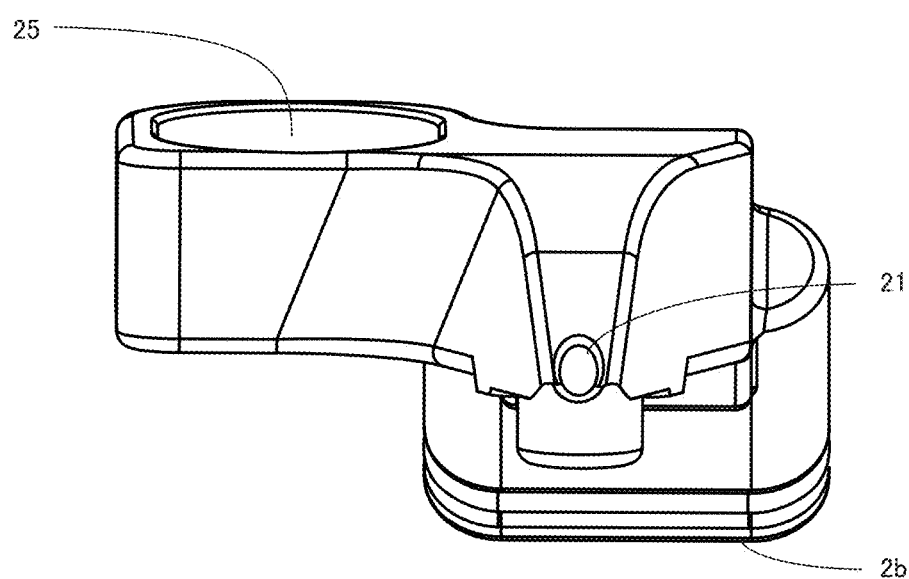
FIG. 5 is a front view of pressing member 2 in the cutting tool holder according to the first embodiment.

FIG. 4 is an upper view of pressing member 2 in the cutting tool holder according to the first embodiment. FIG. 5 is a front view of pressing member 2 in the cutting tool holder according to the first embodiment. Pressing member 2 is a member that positions and fixes, to holder body 1, cutting insert 4 (see FIG. 1 and FIG. 9) placed on seat face 11. As shown in FIGS. 4 and 5, pressing member 2 has a front end portion 2a and a base end portion 2b. Front end portion 2a is an end portion of pressing member 2 located at the seat face 11 side when pressing member 2 is attached to holder body 1 (see FIG. 1). In other words, front end portion 2a is an end portion close to cutting edge 43 of cutting insert 4 placed on seat face 11 of holder body 1. Base end portion 2b is an end portion opposite to front end portion 2a. In other words, base end portion 2b is an end portion distant away from cutting edge 43 of cutting insert 4 placed on seat face 11 of holder body 1. Pressing member 2 is inserted into insertion portion 13 of holder body 1 at base end portion 2b.

Figure 6:
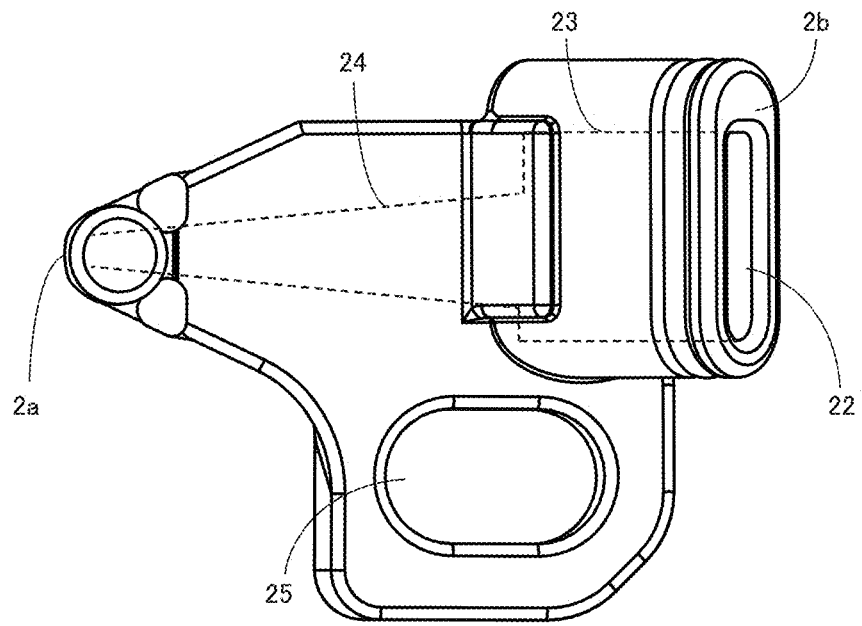
FIG. 6 is a bottom view of pressing member 2 in the cutting tool holder according to the first embodiment.

A coolant ejection hole 21 is provided in pressing member 2. Coolant ejection hole 21 is provided in front end portion 2a of pressing member 2. A plurality of coolant ejection holes 21 may be provided. Pressing member 2 opens at coolant ejection hole 21. The coolant is ejected from coolant ejection hole 21. A coolant inflow hole 22 is provided in pressing member 2. FIG. 6 is a bottom view of pressing member 2 in the cutting tool holder according to the first embodiment. As shown in FIG. 6, coolant inflow hole 22 is provided in base end portion 2b of pressing member 2. Pressing member 2 opens at coolant inflow hole 22. The coolant flows into the inside of pressing member 2 from coolant inflow hole 22.

Figure 7:
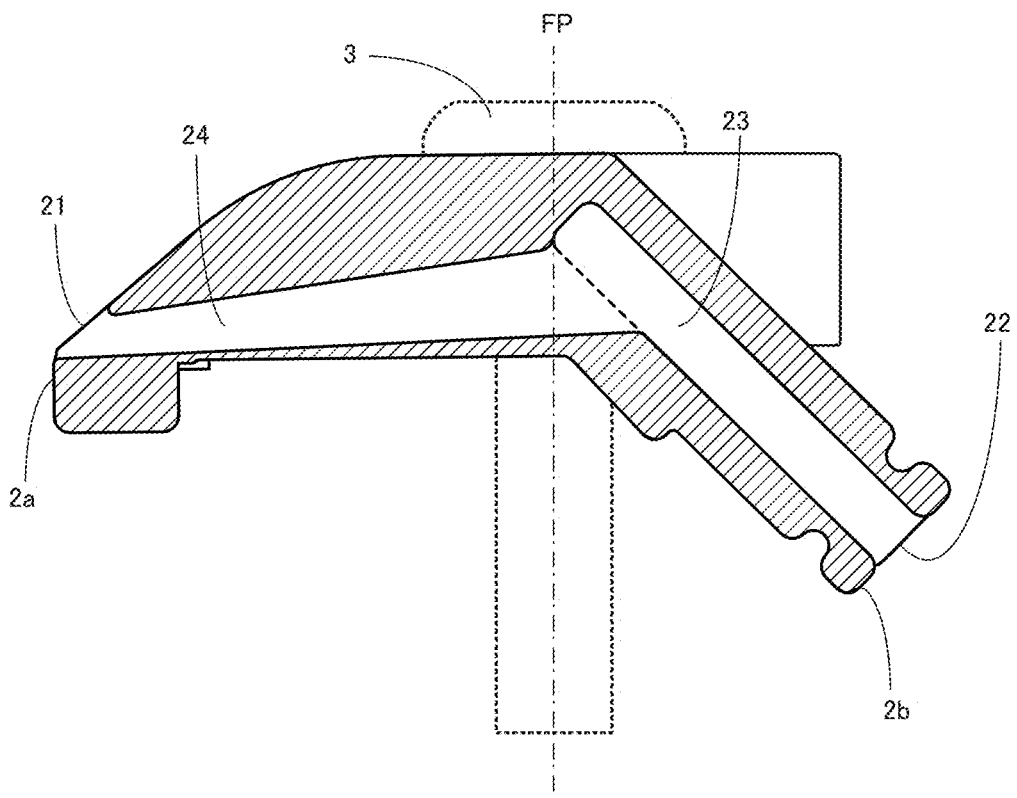
FIG. 7 is a cross sectional view along VII-VII of FIG. 4.

FIG. 7 is a cross sectional view along VII-VII in FIG. 4. As shown in FIG. 7, pressing member 2 is provided with a coolant reservoir 23 and a second flow path 24. Coolant reservoir 23 and second flow path 24 are provided inside pressing member 2.

Inside pressing member 2, coolant reservoir 23 is located at the base end portion 2b side relative to second flow path 24. Coolant reservoir 23 is connected to the outside of pressing member 2 at coolant inflow hole 22. Coolant reservoir 23 is connected to second flow path 24 at an end opposite to coolant inflow hole 22. Inside pressing member 2, second flow path 24 is located at the front end portion 2a side relative to coolant reservoir 23. Second flow path 24 is connected to the outside of pressing member 2 at coolant ejection hole 21.

When pressing member 2 is fixed to holder body 1, base end portion 2b of pressing member 2 is inserted into insertion portion 13, whereby coolant reservoir 23 and first flow path 14 are connected to each other. Therefore, the coolant flowing through first flow path 14 is supplied to coolant reservoir 23, and is stored in coolant reservoir 23. As described above, coolant reservoir 23 and second flow path 24 are connected to each other. Therefore, the coolant stored in coolant reservoir 23 is ejected from coolant ejection hole 21 via second flow path 24.

Coolant reservoir 23 has a cross section A2 in a cross section orthogonal to the flow direction of the coolant.

Second flow path 24 has a cross section A3 in a cross section orthogonal to the flow direction of the coolant. Cross section A2 is larger than cross section A3. Cross section A2 is larger than cross section A1. From another viewpoint, it is said that the coolant reservoir that stores the coolant is provided inside pressing member 2, rather than holder body 1.

Cross section A3 preferably becomes smaller from the coolant reservoir 23 side toward the coolant ejection hole 21 side. From another viewpoint, it is said that second flow path 24 preferably has a tapered shape having a cross section becoming smaller from the coolant reservoir 23 side toward the coolant ejection hole 21 side.

Figure 8:
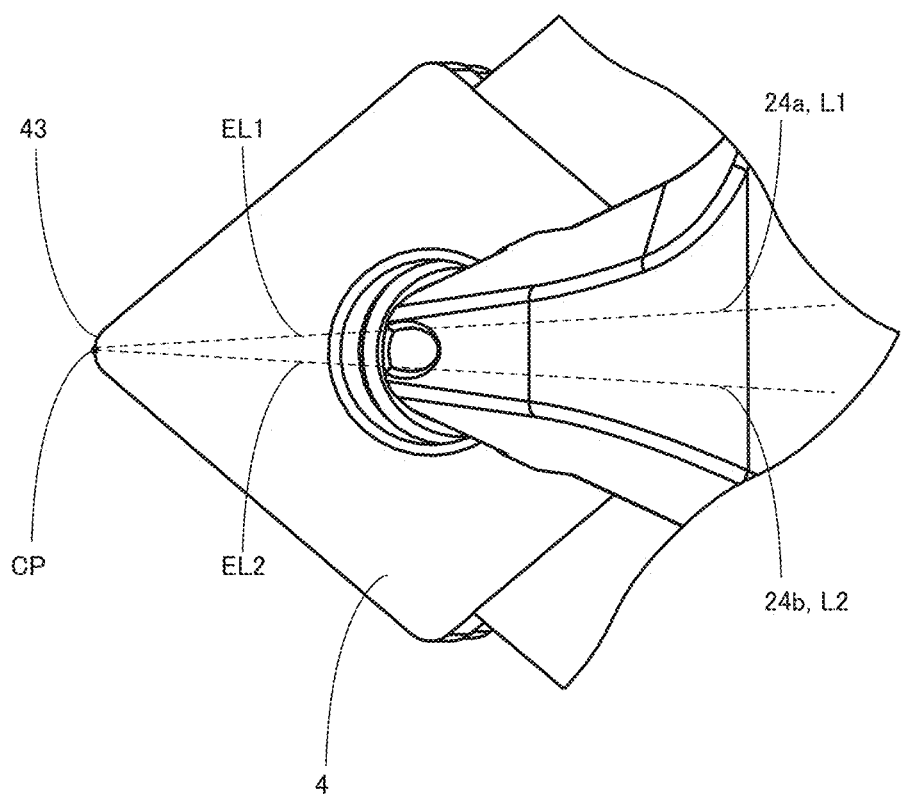
FIG. 8 is a schematic view showing a positional relation between pressing member 2 and a cutting insert 4 in the cutting tool holder according to the first embodiment.

FIG. 8 is a schematic view showing a positional relation between pressing member 2 and cutting insert 4 in the cutting tool holder according to the first embodiment. As shown in FIG. 8, coolant ejection hole 21 is preferably disposed to face cutting edge 43 provided in cutting insert 4.

Second flow path 24 has a first end 24a and a second end 24b. First end 24a is an end of second flow path 24 in a direction that is perpendicular to the ejection direction of the coolant and that is parallel to rake face 41 of cutting insert 4 placed on seat face 11. It should be noted that since cutting insert 4 is disposed such that a face opposite to rake face 41 faces seat face 11 as described below, the direction perpendicular to seat face 11 coincides with the direction perpendicular to rake face 41 when rake face 41 is parallel to the face opposite to rake face 41. Second end 24b is an end opposite to first end 24a. When seen in the direction perpendicular to rake face 41 of cutting insert 4 placed on seat face 11, first end 24a is represented by a first straight line L1. When seen in the direction perpendicular to rake face 41 of cutting insert 4 placed on seat face 11, second end 24b is represented by a second straight line L2. A first extension line EL1 and a second extension line EL2 cross each other at a crossing point CP. First extension line EL1 is an extension line obtained by extending first straight line L1 from coolant ejection hole 21, and second extension line EL2 is an extension line obtained by extending second straight line L2 from coolant ejection hole 21. When seen in the direction perpendicular to rake face 41 of cutting insert 4 placed on seat face 11, crossing point CP is preferably located at a position overlapping with cutting edge 43. It should be noted that crossing point CP may be located at a position displaced from cutting edge 43. The expression "crossing point CP is located at a position displaced from cutting edge 43" is intended to indicate that: crossing point CP is located at a position displaced from cutting edge 43 in the flow direction of the coolant ejected from coolant ejection hole 21; or crossing point CP is located at a position displaced from cutting edge 43 in the direction orthogonal to the flow direction of the coolant ejected from coolant ejection hole 21.

As shown in FIG. 4, a through hole 25 is provided in pressing member 2. Through hole 25 is disposed to overlap with the position of screw hole 12. Fixing member 3 passes through hole 25. Fixing member 3 is a screw, for example. Fixing member 3 is fastened into screw hole 12. Accordingly, pressing member 2 is fixed to holder body 1. It should be noted that the position of pressing member 2 fixed to holder body 1 is referred to as a fixation position FP. In the above-described example, fixation position FP coincides with the position of the center axis of fixing member 3.

The width of through hole 25 in the direction from front end portion 2a toward base end portion 2b is preferably larger than the width of through hole 25 in the direction orthogonal to the direction from front end portion 2a toward base end portion 2b. Through hole 25 has an elliptical planar shape having a longitudinal axis in the direction from front end portion 2a toward base end portion 2b, for example.

A straight line L3 represents a straight line that is parallel to the direction from base end portion 2b toward front end portion 2a and that is tangential to fixing member 3, when seen in the direction perpendicular to rake face 41 of cutting insert 4 (see FIG. 4). Pressing member 2 is preferably in contact with holder body 1 only at a portion located opposite to fixing member 3 with respect to straight line L3.

As shown in FIG. 7, coolant reservoir 23 is located at the base end portion 2b side relative to fixation position FP in the direction from front end portion 2a toward base end portion 2b. More specifically, coolant reservoir 23 is located at the base end portion 2b side relative to the center axis of fixing member 3 in the direction from front end portion 2a toward base end portion 2b.

It should be noted that pressing member 2 can be formed by a 3D printer or a MIM method (Metal Injection Molding method), for example.

Figure 9:
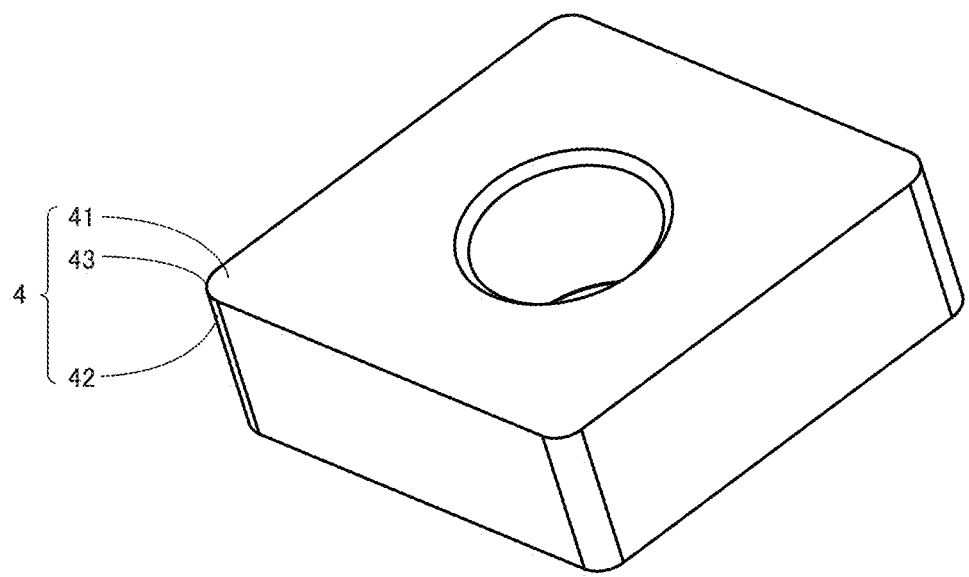
FIG. 9 is a perspective view in one embodiment of cutting insert 4.

FIG. 9 is a perspective view of one embodiment of cutting insert 4. As shown in FIG. 9, cutting insert 4 has rake face 41, flank face 42, and cutting edge 43. Cutting insert 4 is placed on seat face 11 such that the face opposite to rake face 41 faces seat face 11. Cutting insert 4 is pressed by pressing member 2 located at the front end portion 2a side, and is accordingly fixed to seat face 11. Flank face 42 is continuous to rake face 41. Cutting edge 43 is constituted of a ridgeline that defines a boundary between rake face 41 and flank face 42.

The following describes effects of the cutting tool holder according to the first embodiment.

In the cutting tool holder according to the first embodiment, the coolant is ejected and supplied from coolant ejection hole 21 to cutting insert 4 via first flow path 14 provided inside holder body 1 and coolant reservoir 23 and second flow path 24 both provided inside pressing member 2. Therefore, in the cutting tool holder according to the first embodiment, the coolant can be supplied from the rake face 41 side to cutting edge 43.

If the coolant reservoir is provided inside holder body 1, the thickness of holder body 1 becomes thin at its portion provided with the coolant reservoir. Moreover, if the coolant reservoir is provided inside holder body 1, the overall length of holder body 1 becomes longer by the length thereof. Accordingly, if the coolant reservoir is provided inside holder body 1, the rigidity of holder body 1 is decreased. When the rigidity of holder body 1 is decreased, holder body 1 is elastically deformed during cutting to cause vibration (chatter) or the like, which may lead to decreased precision in cutting. Moreover, if the thickness of holder body 1 is increased to compensate the decreased rigidity of holder body 1 caused by providing the coolant reservoir inside holder body 1, the outer dimension of holder body 1 is increased, thus facilitating an interference between holder body 1 and the other portion in each of a workpiece and a processing apparatus during cutting.

On the other hand, in the cutting tool holder according to the first embodiment, coolant reservoir 23 is disposed inside pressing member 2, rather than holder body 1. Therefore, in the cutting tool holder according to the first embodiment, the decreased rigidity of holder body 1 due to the formation of the coolant reservoir therein can be suppressed.

It should be noted that in the cutting tool holder according to the first embodiment, coolant reservoir 23 is disposed at the base end portion 2b side relative to fixation position FP in the direction from front end portion 2a toward base end portion 2b. The portion of pressing member 2 located at the front end portion 2a side relative to fixation position FP mainly contributes to the fixation of cutting insert 4. Therefore, in the cutting tool holder according to the first embodiment, required rigidity of pressing member 2 to fix cutting insert 4 can be secured.

As described above, according to the cutting tool holder according to the first embodiment, the coolant can be supplied to cutting edge 43 from the rake face 41 side of cutting insert 4 while securing the rigidity of the cutting tool holder.

In the cutting tool holder according to the first embodiment, in the case where pressing member 2 is in contact with holder body 1 only at the portion located opposite to fixing member 3 with respect to straight line L3 when seen in the direction perpendicular to rake face 41 of cutting insert 4, pressing member 2 is drawn along a drawing direction of cutting insert 4 when clamping cutting insert 4 to holder body 1 by fixing pressing member 2 to holder body 1 using fixing member 3, whereby cutting insert 4 can be more uniformly fixed by pressing member 2.

In the cutting tool holder according to the first embodiment, when cross section A3 becomes smaller from the coolant reservoir 23 side toward coolant ejection hole 21, the pressure of the coolant flowing through second flow path 24 is increased from the coolant reservoir 23 side toward coolant ejection hole 21, whereby the coolant having a higher pressure can be supplied to cutting insert 4. Therefore, in this case, the cooling effect and swarf crushing effect by the coolant can be improved more.

In the cutting tool holder according to the first embodiment, when crossing point CP is located at a position overlapping with cutting edge 43, the coolant is supplied to cutting edge 43 with the coolant being in the most converged state. Therefore, in this case, the cooling effect and swarf crushing effect by the coolant can be maximized partially. In the cutting tool holder according to the first embodiment, when crossing point CP is located at a position displaced from cutting edge 43, the coolant is supplied to cutting edge 43 with the coolant being spread along the extending direction of cutting edge 43. Therefore, in this case, a wider region of cutting edge 43 can be cooled by the coolant.

In the cutting tool holder according to the first embodiment, when coolant ejection hole 15 is provided in holder body 1 and third flow path 16 is provided inside holder body 1, the coolant can be supplied to cutting edge 43 from both the rake face 41 side and the flank face 42 side. Accordingly, the cooling effect by the coolant and the lubrication effect by the coolant can be further improved.

Second Embodiment

The following describes a cutting tool holder according to a second embodiment.

It should be noted that in the description below, differences from the cutting tool holder according to the first embodiment will be mainly explained and the same explanation as described above will not be repeated.

Figure 10:
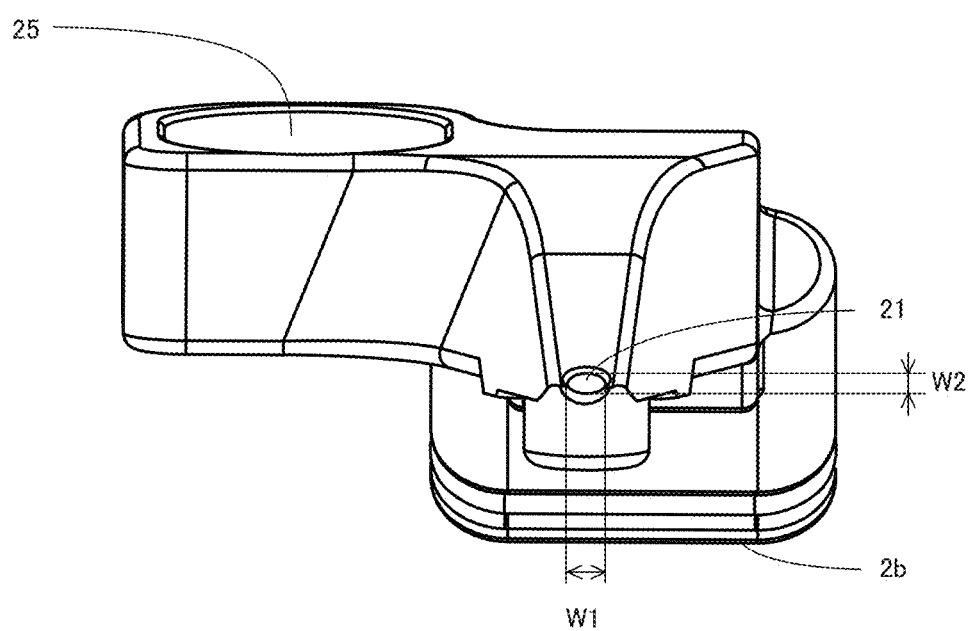
FIG. 10 is a front view of a pressing member 2 in a cutting tool holder according to a second embodiment.

The cutting tool holder according to the second embodiment has holder body 1, pressing member 2, and fixing member 3. In these points, the cutting tool holder according to the second embodiment is in common with the cutting tool holder according to the first embodiment. However, the cutting tool holder according to the second embodiment is different from the cutting tool holder according to the first embodiment in terms of the configuration of coolant ejection hole 21. FIG. 10 is a front view of pressing member 2 in the cutting tool holder according to the second embodiment.

As shown in FIG. 10, coolant ejection hole 21 has a first width W1 and a second width W2. First width W1 is a width of coolant ejection hole 21 in a direction that is perpendicular to the ejection direction of the coolant and that is parallel to rake face 41 of cutting insert 4 placed on seat face 11. Second width W2 is a width of coolant ejection hole 21 in the direction perpendicular to rake face 41 of cutting insert 4 placed on seat face 11. Preferably, first width W1 is larger than second width W2. Coolant ejection hole 21 has an elliptical planar shape, for example. However, the shape of coolant ejection hole 21 is not limited to this. Coolant ejection hole 21 may have a rectangular planar shape, for example.

In the cutting tool holder according to the second embodiment, since first width W1 is larger than second width W2 as described above, the coolant is supplied to the vicinity of cutting edge 43 with the coolant being in a flat shape along cutting edge 43. As a result, the coolant is facilitated to enter between cutting edge 43 and the swarf. Accordingly, in this case, the swarf crushing effect by the coolant can be further improved.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: holder body; 1a: first end; 1b: second end; 1c: first surface; 1d: second surface; 11: seat face; 12: screw hole; 13: insertion portion; 14: first flow path; 15: coolant ejection hole; 16: third flow path; 2: pressing member; 2a: front end portion; 2b: base end portion; 21: coolant ejection hole; 22: coolant inflow hole; 23: coolant reservoir; 24: second flow path; 24a: first end; 24b: second end; 25: through hole; 3: fixing member; 4: cutting insert; 41: rake face; 42: flank face; 43: cutting edge; 5: washer; A1, A2, A3: cross section; CP: crossing point; EL1: first extension line; EL2: second extension line; FP: fixation position; L1: first straight line; L2: second straight line; L3: straight line; W1: first width; W2: second width.

The invention claimed is:

1. A cutting tool holder that supports a cutting insert including a rake face, a flank face continuous to the rake face, and a cutting edge constituted of a ridgeline that defines a boundary between the rake face and the flank face, the cutting tool holder comprising:
   a holder body having a seat face on which the cutting insert is placed;
   a pressing member that positions and fixes, to the holder body, the cutting insert placed on the seat face; and
   a fastener that fixes the pressing member to the holder body,
   wherein
     the pressing member has a front end portion and a base end portion, the front end portion being closer to the cutting edge of the cutting insert placed on the seat face than the base end portion, the base end portion having a base end surface, a perimeter of the base end surface has an elliptical shape,
     the front end portion is provided with a first coolant ejection hole via which coolant is ejected,
     a first flow path through which the coolant flows is provided inside the holder body, a coolant reservoir and a second flow path are provided inside the pressing member, the coolant reservoir is connected, via the non-circular coolant inlet hole, to the first flow path when the pressing member is fixed to the holder body, and the second flow path supplies, to the first coolant ejection hole, the coolant from the first flow path and the coolant reservoir, the coolant reservoir intersects the base end surface, in respective cross sections orthogonal to a flow direction of the coolant, the coolant reservoir has a cross sectional area, the first flow path has a cross sectional area, and the second flow path has a cross sectional area, the cross sectional area of the coolant reservoir is larger than the cross sectional area of the first flow path, the cross sectional area of the coolant reservoir is larger than the cross sectional area of the second flow path, an entirety of the coolant reservoir is disposed at a position closer to the base end surface than a center longitudinal axis of the fastener, in a direction from the front end portion toward the base end portion, the flow direction of the coolant in the coolant reservoir is inclined relative to the center longitudinal axis of the fastener, in a plan view of the pressing member, the entirety of the coolant reservoir and an entirety of the second flow path are on an opposite side of an imaginary straight line than the fastener, the imaginary straight line is parallel to the direction from the front end portion toward the base end portion, the imaginary straight line extends from the front end portion to the base end surface, the pressing member has a through-hole through which the fastener passes, in the plan view of the pressing member, the through-hole has an elliptical shape, and in the plan view of the pressing member, a major axis of the through-hole is parallel to the direction from the front end portion toward the base end portion.

2. The cutting tool holder according to claim 1, wherein the pressing member is in contact with the holder body only at a portion located opposite to the fastener with respect to the imaginary straight line that is parallel to the direction from the front end portion toward the base end portion, the imaginary straight line is tangential to the fastener in the plan view of the pressing member.

3. The cutting tool holder according to claim 1, wherein the cross sectional area of the second flow path in respective cross sections orthogonal to the flow direction of the coolant becomes smaller from the coolant reservoir toward the first coolant ejection hole.

4. The cutting tool holder according to claim 1, wherein a width of the first coolant ejection hole in a direction that is perpendicular to an ejection direction of the coolant is parallel to the rake face of the cutting insert placed on the seat face is larger than a width of the first coolant ejection hole in a direction perpendicular to the rake face of the cutting insert placed on the seat face.

5. The cutting tool holder according to claim 1, wherein the second flow path has a first end and a second end opposite to the first end, and a first virtual extension line and a second virtual extension line cross each other at a position overlapping with the cutting edge of the cutting insert placed on the seat face when seen in a direction perpendicular to the rake face of the cutting insert placed on the seat face, the first virtual extension line being a virtual extension line obtained by extending a straight line representing the first end from the first coolant ejection hole when seen in the direction perpendicular to the rake face of the cutting insert placed on the seat face, the second virtual extension line being a virtual extension line obtained by extending a straight line representing the second end from the first coolant ejection hole when seen in the direction perpendicular to the rake face of the cutting insert placed on the seat face.

6. The cutting tool holder according to claim 1, wherein the second flow path has a first end and a second end opposite to the first end, and a first virtual extension line and a second virtual extension line cross each other at a position displaced from the cutting edge when seen in a direction perpendicular to the rake face of the cutting insert placed on the seat face, the first virtual extension line being a virtual extension line obtained by extending a straight line representing the first end from the first coolant ejection hole when seen in the direction perpendicular to the rake face of the cutting insert placed on the seat face, the second virtual extension line being a virtual extension line obtained by extending a straight line representing the second end from the first coolant ejection hole when seen in the direction perpendicular to the rake face of the cutting insert placed on the seat face.

7. The cutting tool holder according to claim 1, wherein the holder body is provided with a second coolant ejection hole via which the coolant is ejected to the cutting edge of the cutting insert from the flank face side of the cutting insert placed on the seat face, and a third flow path that supplies, to the second coolant ejection hole, the coolant flowing through the first flow path is provided inside the holder body.

* * * * *